(12) United States Patent
Baesjou et al.

(10) Patent No.: US 8,778,229 B2
(45) Date of Patent: Jul. 15, 2014

(54) ROBUST MULTI PARTICLE SYSTEM FOR COLOR ELECTROPHORETIC DISPLAYS WITH VERY LOW DRIVING VOLTAGES COMPRISING A LOW AMOUNT OF ELECTROLYTES

(75) Inventors: Patrick John Baesjou, Eindhoven (NL); Lucas Josef Maria Schlangen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 229 days.

(21) Appl. No.: 11/915,014

(22) PCT Filed: May 10, 2006

(86) PCT No.: PCT/IB2006/051464
§ 371 (c)(1),
(2), (4) Date: Nov. 20, 2007

(87) PCT Pub. No.: WO2006/126120
PCT Pub. Date: Nov. 30, 2006

(65) Prior Publication Data
US 2008/0273237 A1 Nov. 6, 2008

(30) Foreign Application Priority Data
May 27, 2005 (EP) .................... 05104548

(51) Int. Cl.
*H01B 1/12* (2006.01)
*C25B 7/00* (2006.01)

(52) U.S. Cl.
USPC ............ 252/500; 359/296; 204/405; 204/600

(58) Field of Classification Search
USPC ............ 252/500; 359/296; 204/450, 600, 405
See application file for complete search history.

(56) References Cited

U.S. PATENT DOCUMENTS

| 4,680,103 | A | 7/1987 | Beilin et al. | |
|---|---|---|---|---|
| 6,117,368 | A | 9/2000 | Hou | |
| 7,034,987 | B2 * | 4/2006 | Schlangen | 359/296 |
| 7,236,291 | B2 * | 6/2007 | Kaga et al. | 359/296 |
| 7,397,597 | B2 * | 7/2008 | Verschueren et al. | 359/296 |
| 2003/0214697 | A1 | 11/2003 | Duthaler et al. | |
| 2005/0104843 | A1 * | 5/2005 | Schlangen | 345/107 |
| 2005/0179983 | A1 | 8/2005 | Sakai et al. | |
| 2005/0270619 | A1 * | 12/2005 | Johnson et al. | 359/265 |
| 2007/0064302 | A1 * | 3/2007 | Johnson et al. | 359/296 |
| 2007/0091061 | A1 * | 4/2007 | Schlangen et al. | 345/107 |
| 2007/0206271 | A1 * | 9/2007 | Verschueren et al. | 359/296 |
| 2008/0042928 | A1 * | 2/2008 | Schlangen et al. | 345/55 |
| 2008/0252592 | A1 * | 10/2008 | Duine et al. | 345/107 |
| 2008/0273237 | A1 * | 11/2008 | Baesjou et al. | 359/296 |

FOREIGN PATENT DOCUMENTS

| EP | 1254930 A | 11/2002 |
| JP | 2004240409 A | 8/2004 |
| WO | 200192359 A | 12/2001 |
| WO | 2003081331 A | 10/2003 |
| WO | WO 2004111716 A1 * | 12/2004 |
| WO | WO 2005040908 A1 * | 5/2005 |

OTHER PUBLICATIONS

Sample dispersion & refractive index guide, Malvern Instruments Ltd, ver. 3.1, Apr. 1997, 54 pages.*
M. D. Croucher et al; "Use of Sterically Stabilized Polymer Colloids As Electrostatically-based Liquid Developers", Journal of Applied Polymer Science, Vol. 30, pp. 593-607, 1985.

* cited by examiner

*Primary Examiner* — Douglas McGinty
(74) *Attorney, Agent, or Firm* — Larry Liberchuk

(57) ABSTRACT

An electrophoretic dispersion with at least two particle species is proposed in which a minimal number (and concentration) of free compounds is present in solution. All chemicals needed to color and stabilize the pigment particles are preferably covalently attached to or within the particles. This enhances the robustness of the system and minimizes the conductivity of the dispersion so that the driving voltage for an electrophoretic display is reduced.

15 Claims, No Drawings

ROBUST MULTI PARTICLE SYSTEM FOR COLOR ELECTROPHORETIC DISPLAYS WITH VERY LOW DRIVING VOLTAGES COMPRISING A LOW AMOUNT OF ELECTROLYTES

The present invention relates to an electrophoretic dispersion and the particles that can be contained therein. More in particular the invention relates to an electrophoretic dispersion that contains low amounts of free electrolyte and other additives and to the use of these dispersions and particles in electrophoretic displays with low driving voltages and low conductivity.

Current research in the field of electrophoretic displays is focusing on full-colour electrophoretic displays in which every pixel can be every colour. One solution was proposed in U.S. Pat. No. 6,117,368.

U.S. Pat. No. 6,117,368 discloses a two stage polymerisation process wherein dielectric particles are formed. The process comprises the polymerisation of a first monomer in a dispersion medium (which is different from the dielectric medium), thereby forming particles. A second monomer is provided in the same dispersion medium and polymerised and grafted onto the formed particles whereby a functional monomer can be used together with the second monomer to provide a surface functionality that can be charged in an electrophoretic display. The dispersion medium is substituted with a desired dielectric medium in a series of washing steps to remove the original dispersion medium. The solvent washed particles are dispersed in the desired dielectric medium with the addition of a charge control agent and optionally a (co)-stabiliser.

The dispersion according to U.S. Pat. No. 6,117,368 thus contains a charge control agent and an optional (co)-stabiliser in addition to the charged dielectric particles. The disadvantage of the use of charge control agents is that, in order to provide the one or more types of particles with their charges, a mixture of charging agents is used that usually are ionic in origin in near stoichiometric or even larger amounts. Furthermore, colloidal stability of these systems is achieved by the addition of separate (externally added) stabilisers. There are several disadvantages associated with these systems.

In case of an externally added stabiliser, equilibrium is reached between the stabiliser dissolved in the bulk of the electrophoretic fluid and the stabiliser on the surface of the particles. This means that larger amounts of stabiliser are required than is needed to sufficiently cover the particle surface. This usually leads to an increased viscosity of the system. This higher viscosity leads to slower movement of the particles and hence to a slower switching speed of the electrophoretic display pixel. This holds especially true for in-plane switching schemes where the distances that the particles must travel are larger than those in an up-down switching scheme. These lower speeds may be overcome by applying stronger electric fields (i.e. higher potential) but this is not desirable because then more robust electronics are required, higher leakage currents and more potential for artefacts such as electrochemistry and joule heating. A charging agent is usually required to impart charge upon a particle so that it can be moved by applying an electric field. The charge the particle acquires is a combination of the surface chemistry of the particle and the chemical nature of the charging agent. Charging agents may be ionic or non-ionic in nature. Two non-limiting examples can be given. In the first example, a particle with acidic surface groups may be combined with a (non-ionic) basic charging agent (e.g. an amine). The charging agent abstracts a proton from the particle surface, leading to a negatively charged particle and a positively charged counter ion (the protonated charging agent) in the surrounding fluid.

In the second example, an ionic charging agent consisting of a sodium salt may be combined with a particle with a surface that has an affinity for sodium ions, leading to a positively charged particle (having absorbed a sodium ion) and the negatively charged counter-ion of the charging agent in the surrounding fluid.

In both cases, the ionic content of the surrounding fluid is increased considerably due to the presence of the (charged) charging agents. This is even the case if no particles are present due to the spontaneous dissociation of ionic charging agents and/or charging by interaction with impurities such as water, even by non-ionic charging agents. This 'extraneous' charge is undesirable and a disadvantage of the known systems for a number of reasons.

One is that the presence of larger quantities of (molecular) charged entities will lead to higher leakage current in devices. This means power loss and more frequent refreshing of the driving electronics. Another is that when an electric field is applied over an electrophoretic suspension all charged species will start to migrate to the electrode of opposite charge. This results in an inhomogeneous distribution of the positively and negatively charged species, giving rise to a counter electric field, which shields the external field. Ultimately the external field may be completely compensated by the internal field so that the charged species no longer exhibit electrophoretic migration. So the external field should be high enough to overcome the internal field even at maximum separation (complete switching of the pixel) of the charged species. Consequently when the ionic content of the suspension is higher, a higher external field will have to be applied to enable full switching of an electrophoretic cell. Higher fields are not desirable as mentioned hereinbefore. Furthermore, the presence of larger amounts of charged species means that there is an increased probability that unwanted electrode reactions (electrochemistry) takes place. This holds especially for charged charging agents since they are very small compared to the particles and hence may come into more intimate contact with the electrode surface than the particles.

The central problem thus is that electrophoresis involves charged (pigment) particles and thus requires the presence of counter charges (in the form of charged charging agents). These counter charges, as well as the aforementioned non-particle related 'extraneous' charges, enhance the conductivity of the dispersion. This is not regarded as favourable as low conductivity dispersions are important for electrophoretic displays in order to minimise internal field screening effects and to allow for low driving voltages. It is hence in general desirable to have a system with as low an ionic content as possible in the fluid surrounding the particles, i.e. with the least possible amount of charged species (other than particles) in the dispersion.

It is an object of the present invention to overcome the disadvantages of the prior art, such as the use of significant amounts of charging agents and/or the addition of (extraneous) (co)-stabilisers.

The use of charging agents and (co)-stabilisers generally increases the amount and concentration of the free compounds in the dispersion. This has, therefore, the disadvantage that higher voltages are necessary when such dispersions are used in electrophoretic displays. A further disadvantage is that due to the relative large number of compounds that are present in the dispersion, the desired chemical robustness of the system may be impaired.

It is an object of the invention to provide for means and methods for achieving an electrophoretic dispersion wherein the number of free compounds (other than particles) and their concentration is kept to a minimum. It is an object of the invention to provide for electrophoretic dispersions comprising electrophoretic particles wherein all components that are needed to colour, charge and stabilise the electrophoretic particles are (covalently) attached to, irreversibly adsorbed or incorporated within the particles.

The present inventors have found that by providing the desired functionalities attached to or incorporated within the particles, the objects of the invention can be achieved. In its broadest idea the invention resides in a materials system that contains a minimal amount of charged compounds and/or (co-) stabilisers in the electrophoretic dispersion. Preferably all chemistry needed is (covalently) attached to, irreversibly adsorbed, or incorporated within the particle species in the dispersion. The invention thus relates in one aspect to a material system containing at least two types of (pigmented) particles wherein the two types each may have different optical properties and wherein the two types may act as charging agents for each other. Preferably, one of the particles has ionisable surface groups that can dissociate into a first charged particle whereby the charge remains at the surface of the particle and an ionic species that can leave the surface. The second particle is capable of binding the ionic species to provide for a second charged particle that is charged oppositely from the first charged particle.

One of the advantages of the present invention is that the chemical robustness of the system is enhanced and the conductivity of the present dispersion is minimised so that the driving voltage of an electrophoretic display comprising the dispersion according to the invention is minimised.

These and other aspects of the invention will be apparent from and elucidated with reference to the embodiment(s) described hereinafter.

In one aspect the invention pertains to an electrophoretic dispersion comprising at least two, preferably two, particle species wherein each particle species contains one or more charge forming groups and/or one or more (steric or otherwise) stabilisers, wherein the charge forming groups and stabilisers are bonded to the particle species either by covalent bonding or by non-covalent adsorption or bonding.

By bonding or connecting the stabiliser and charge forming groups to the particle species, only a minimal number and concentration is needed in the solution. This reduces the ionic content of the dispersion drastically. Previously, it was not uncommon that several stoichiometric equivalents of various ionic compounds were present in order to create a functional electrophoretic dispersion. The present invention lowers the type and amounts of such ionic compounds considerably such that the chemical robustness of the system is increased. Furthermore the conductivity of the dispersion in minimised so that the driving voltage is considerably lowered. The present invention also minimises the content of non-ionic compounds such as stabilisers and other components, preventing undesirable increases in viscosity.

Such dispersions can be made in various ways. One way is to bind the components of the dispersion, such as the charge forming groups and the stabilisers to the particle species. This bonding can be done in many ways. One of these ways is covalently. In this embodiment, all functional components are covalently bonded to the particle species. This can be achieved as is exemplified in herein below for latex (polymer) based particles. In one embodiment, the charge forming groups and/or stabilisers are non-covalently bonded to the particle species. This can be achieved by physisorption or chemisorption of the desired charge forming groups and/or stabilisers onto the particles species, provided this is essentially non-reversible. In such an embodiment the particles can be for example be (inorganic) glass, silica or other sol-gel systems and may be porous. It is noted that, under certain conditions which are in itself known in the art, covalent bonding of functional components is also possible with glass, silica or other sol-gel systems. Preferably the chemi- and physi-sorptions are considered irreversible, i.e. the dissociation constant of the adsorbed particle is sufficiently low such as to not compromise the functionality of the electrophoretic dispersion.

Preferably the electrophoretic dispersion is substantially free of other compounds, in particular of charged compounds or free electrolytes. Preferably, the dispersion consists of the charged particle species in combination with a (preferably high-purity) dispersion medium. Preferably, substantially all charges, positive and negative are located on the respective particle species. In one embodiment, more than 90%, preferably more than 95%, more preferably more than 99% and even more preferable more than 99.9% of the positive and negative charges in the dispersion is located on the particle species. In a preferred embodiment, the dispersion does not contain any other charged particles or compounds or components than those from the charged particle species. The charged particle species are preferably present in the dispersion in a ratio of the total amount of positive charges to the total amount of negative charges, expressed as $N^+ * Q^+ : N^- * Q^-$, between 0.9 and 1.1, preferable between 0.99 and 1.01, more preferably between 0.999 and 1.001 even more preferably between 0.9999 and 1.0001, wherein $N^+$: particle concentration of positively charged particles;
$N^-$: particle concentration of negatively charged particles;
$Q^+$: particle charge of positively charged particles;
$Q^-$: particle charge of negatively charged particles.

Preferably, the electrophoretic dispersion contains less than 10%, preferably less than 5, more preferably less than 1%, even more preferably less than 0.1% of other free electrolytes (and other (uncharged) additives) compared to the total amount of particle species.

In one aspect, the invention pertains to a method for the preparation of an electrophoretic dispersion comprising admixing particle species comprising ionisable surfaces, preferably in a suitable dispersion medium. In certain embodiments, the admixed particle species comprising ionisable groups act as charging agents for each other.

By mixing the two types of particles, transfer of the counter ion from one particle to the other may occur, leading to oppositely charged particles. Achieving an equilibrium may be a very slow process as the particles will not often come into close contact due to the steric stabilisation that is preferably inherently present in the particles. In these embodiments, a small amount of a charge transfer agent may be added. Such a transfer agent is preferably non-ionic with an affinity for the counter ion that is between that of both types of particle, is able to stabilise the counter ion to an extent in the dispersion medium and be able to come into close contact with either type of particle. The counter ion may be absorbed by the charge transfer agent from the first particle and may be deposited in the second particle leading potentially to the equilibrium state being reached much faster.

As is clear, the addition of such a charge transfer agent may lead to an increased ionic content of the dispersion since some of the ions will exist for some time with the charge transfer agent in solution. However, since the transfer agent is only required to speed up attainment of the equilibrium state, only a fraction of the amount that is normally used is needed. In certain embodiments the charge transfer agent is preferably a non-ionic charge transfer agent, more preferably a sterically hindered amine or ether.

In certain embodiments of the invention, the charge transfer agent is present, preferably in an amount of amount of less than 10%, more preferably less than 5, even more preferably less than 1%, particularly preferred in an amount that is less than 0.1%, compared to the total amount of particle species in the dispersion.

In one aspect, the invention pertains to an electrophoretic dispersion comprising at least two particle species, the first species comprising ionisable surface groups that can dissociate into a charged first particle species and a first ionic species, the second species comprising surface groups that can bind the ionic species, wherein the first species provides a charge to the second species, thereby providing a first and a second charged species, wherein the first and second charged species are oppositely charged.

In one aspect, the invention pertains to a particle species comprising ionisable surface groups. In one aspect, one of the particle species is capable of dissociating in a first ionic species and a first charged particle species. In one aspect, one of the particle species is capable of binding an ionic species, preferably the first ionic species, thereby providing a charged particle species, preferably an charged species with a charge opposite to that of the first charged particle species. In one aspect of the invention, the first ionic species is capable of providing a charge to a second particle species, thereby providing a second charged particle species that is oppositely charged from the first charged particle species. In certain embodiments, the first and second particle species carry opposite charges. In certain embodiments, the first ionic species is a cation.

As explained herein before, the particles preferably are inherently stable by chemically (covalently) attached stabilising surface groups.

The invention will now be exemplified by the following embodiment which is based on a generic method described by Croucher et al. in J. Appl Polymer Sci. 1985, 30 593-607 for the preparation of custom made particles. The idea is to start with a (polymeric) stabiliser that is well soluble in the dispersion medium (usually an aliphatic solvent such as dodecane or Isopar). The stabiliser can be one or more of numerous polymers. In this case poly(2-ethylhexyl) methacrylate is used. Onto this polymer, a polymer is grafted that by itself is not soluble in the dispersion medium. This is done by adding a small amount of the corresponding monomer and a radical initiator (e.g. benzoyl peroxide) to the stabiliser. A suitable monomer is vinyl acetate (MVA) which is soluble in the dispersion medium, whereas the corresponding polymer (poly(vinyl acetate), PVA) is insoluble in the dispersion. After grafting, an excess of MVA and initiator can be added to form the actual latex bead, which is embedded in the stabilising polymer. The beads may be coloured by incorporation of dyes or pigments into the polymer bulk. Chargeable groups are incorporated by adding functionalised monomers in the steps of the method. This can be acidic functionalities (e.g. vinyl acetic acid, methacrylic acid) or basic functionalities (e.g. vinyl amines, acrylamide). In this way acidic and or basic beads can be made. When these beads are mixed, proton transfer may occur from one bead to another, resulting in negatively and positively charged beads respectively, without the need of an externally added charging agent.

Instead of incorporating the acidic or basic groups directly into the bulk polymer it is also possible to use monomers containing precursor groups. This may be necessary or advantageously if the active functionalities interfere with the grafting and/or polymerisation reactions. An option is the use of acrylonitrile ($CH_2=CH_2-CN$) either as additive or as bulk material. After the formation of stabilised beads, the cyano functionalities of the surface of the beads may be oxidised or reduced to form acidic or basic groups respectively. If the charging equilibrium is not established fast enough, a charge transfer agent can be added. Many such agents are possible but non-ionic ones are preferred such as sterically hindered amines, ethers etc. The charge transfer agent is added in at least a sub-stoichiometric amount compared to the particle species, preferably not more than 50% compared to the total amount of particle species, more preferably not more than 25%.

Using this method very versatile and flexible material systems have been made. The particles prepared are inherently stable and have tailor made surface chemistry and hence charging properties. They can be made in any colour or refractive index without the colour or the refractive index influencing the surface chemistry, by the addition of dyes or pigments or by the selection of appropriate monomers. Furthermore, the material system does not need an external charging agent when two types of particles are mixed with complementary surface chemistries. In this way the viscosity and ionic content of the dispersion medium are minimised. This enhances the chemical stability of the system and decreases the conductivity and driving voltage needed to address the panel.

The dispersion medium itself can be selected from a wide variety as are commonly known in the art. In certain embodiments the dispersion medium is selected from the group consisting of saturated and/or unsaturated, branched or unbranched, optionally hetero-atom (S,O,N etc.) containing, substituted or unsubstituted (halogens, nitro, amine etc.), aliphatic or (hetero)aromatic hydrocarbon solvents or (per)fluorinated hydrocarbons or (per)fluorinated polyethers, preferably from the group consisting of tetrachloroethane, carbon tetrachloride, pentane, octane, decane, cyclohexane, benzene, toluene, xylene, undecane, dodecane, tetradecane, Isopars, chloroform sec-butylbenzene, Fluorinert™ (a group of inert solvents that are (part) fluorinated)and the like, or a mixture thereof. Preferably, the dispersion medium is also a low-dielectric medium that preferably can be used in an electrophoretic dispersion.

In one aspect, the invention provides a method for the synthesis of chargeable particle species comprising the steps of:

(a) providing a stabiliser that is soluble in a dispersion medium;

(b) providing a first amount of core monomer that is soluble in the medium and a radical initiator;

(c) initiating (dispersion) polymerisation, thereby providing a core polymer that is insoluble in the dispersion medium, that is preferably grafted onto on the stabiliser, to provide a grafted polymer stabiliser;

(d) reacting the grafted polymer stabiliser in the dispersion medium with a second, preferably excess, amount of the core monomer and a radical initiator to provide a bead;

(e) incorporating chargeable groups and/or steric stabilisers in the bead by adding functionalised monomers in steps (b), (c) and/or (d).

In certain embodiments, the chargeable groups may already be provided in the stabilisers of step (a). The chemistry used in the method for the synthesis is in principle known in the art. The main feature of the method is that the charge forming groups and/or the stabilisers are covalently incorporated in the charged particle or at least (less-preferred) irreversibly bonded. Irreversible in this respect can be defined as a dissociation constant that corresponds to the expected lifetime of the electrophoretic dispersion, i.e. several years at least. Irreversible in this respect can also be defined as a dissociation constant that corresponds to virtually no free charge forming species and/or stabilisers existing freely in solution, i.e. not bonded to the particle.

The stabiliser can be selected for example from the group consisting of polydimethylsiloxane, polypropylene, polyisobutylene, poly(2-ethylhexyl)methacrylate, polystyrene and the like.

The stabiliser functions as the outer shell of the particles and can be selected from a wide variety of polymeric materials. The stabiliser used in the dispersion of the present invention can be visualised in the form of 'hairs' that extend form the particle species and in this manner provides for (steric) stabilisation of the particle in the dispersion. The stabiliser is preferably soluble in the dispersion medium so that the first polymerisation step can be performed efficiently.

The core monomer is preferably soluble in the dispersion medium. The core monomer is selected for example from vinyl acetate, divinylbenzene, and styrene and the like.

The core monomer is preferably used in an amount that is sufficient to provide for a core polymer that can be grafted onto the stabiliser. The polymerisation is initiated by the addition of a radical initiator, normally in a conventional amount.

The radical initiator is for example a peroxide or azo radical initiator, preferably selected from the group consisting of 4,4'-azobis(r-cyanopentanoic acid),2,2'-azobis(2-methylbutyrontrile), benzoyl peroxide, lauroyl peroxide, octanoyl peroxide, 2,2'-azobisisobutyronitrile and the like. The second amount of core monomer can be identical to the first monomer. The functionalised monomers can contain basic or acidic functionalities to provide for the desired opposite charges.

The acidic functionalised monomers can be selected from the group consisting of vinyl acids and/or acrylic acids, such as vinyl acetic acid, (meth)acrylic acid, vinyl sulfonic acid and the like. The basic functionalities can be selected for example from vinyl amines and/or acryl amides and the like.

In certain preferred embodiments, the functionalised monomer is incorporated as a precursor group, preferably comprising a cyanogroup, for example acrylonitrile.

By incorporating the functionalised monomer in the form of a precursor group, the surface chemistry of the particles can be more uniformly controlled (The use of precursor groups is also advantageous in case the functionalised group interferes with one of the steps of the method such as the grafting or polymerisation step. By using a precursor group, the desired particles can be synthesised and the desired functionality can be added later. Only in a subsequent functionalisation step, such as the reduction of the oxidation of the precursor group to provide for a basic or an acidic functionalised group, the difference between the particles is created. Thus in certain embodiments, the functionalised monomer is obtained by reduction or oxidation of the precursor group to provide for a basic or acidic functionalised group, respectively.

To impart the particle species with the desired colour that can be used in an electrophoretic display, the method can comprise a step wherein a dye or a pigment is incorporated in the particle. Furthermore, one or more of the particle species can be provided with different optical properties such as a different refractive index (which can be achieved by selection of the monomer for the polymerparticles, such as (modified) polyvinylalcohol) or color for instance by the incorporation of dyes and/or pigments. The invention further pertains to electrophoretic displays comprising the electrophoretic dispersion of the invention and to the use of particle species wherein charge forming groups and stabilisers are covalently and/or irreversibly incorporated to reduce the viscosity and driving voltages of electrophoretic displays.

As used herein, 'comprising' does not exclude the presence of other elements or steps, 'a' or 'an' does not exclude a plurality. Any reference signs in the claims shall not be construed as to limit the scope of protection.

The invention claimed is:

1. Electrophoretic dispersion comprising a first polymer particle species having a first color and a first refractive index and a second polymer particle species having a second color and a second refractive index, wherein each particle species contains one or more charge forming groups, wherein the charge forming groups are bonded to the particle species either by covalent bonding or by non-covalent adsorption or bonding, and wherein the first particle species comprises an ionisable surface group that can be ionized by reduction or oxidation so that the first particle species is capable of dissociating into a first ionic species and a first charged particle species.

2. Electrophoretic dispersion according to claim 1, wherein non-covalent adsorption comprises physisorption or chemisorption, preferably irreversible physisorption or chemisorption.

3. Electrophoretic dispersion according to claim 1, wherein the dispersion contains less than 10%, preferably less than 5, more preferably less than 1%, even more preferably less than 0,1% of other free electrolytes (and other (uncharged) additives) compared to the total amount of particle species.

4. Electrophoretic dispersion according to claim 1, wherein the ratio between the total amount of positive charges and the total amount of negative charges, expressed as N+*Q+: N−*Q−, is between 0.9 and 1.1, preferable between 0.99 and 1.01, more preferably between 0.999 and 1.001 even more preferably between 0.9999 and 1.0001, wherein
   −N+: particle concentration of positively charged particles;
   −N−: particle concentration of negatively charged particles;
   −Q+: particle charge of positively charged particles;
   −Q−: particle charge of negatively charged particles.

5. Electrophoretic dispersion according to claim 1, wherein more than 90%, preferably more than 95%, more preferably more than 99% and even more preferable more than 99,9% of the positive and negative charges in the dispersion is located on the particle species.

6. Electrophoretic dispersion according to claim 1, wherein the dispersion further comprises a charge transfer agent, preferably in an amount of less than 10%, preferably less than 5, more preferably less than 1%, even more preferably less than 0,1%, compared to the total amount of particle species.

7. Electrophoretic dispersion according to claim 1, further comprising a dispersion medium selected from the group consisting of saturated and/or unsaturated, branched or unbranched, optionally hetero-atom (S,O,N etc.) containing, substituted or unsubstituted (halogens, nitro, amine etc.), aliphatic or (hetero)aromatic hydrocarbon solvents or (per)fluorinated hydrocarbons or (per)fluorinated polyethers, preferably from the group consisting of tetrachloorethane, carbon tetrachloride, pentane, octane, decane, cyclohexane, benzene, toluene, xylene, undecane, dodecane, tetradecane, Isopars, chloroform sec-butylbenzene, Fluorinert™ and the like, or a mixture thereof.

8. Method for the preparation of an electrophoretic dispersion comprising admixing particle species comprising ionisable surface groups as defined in claim 1, preferably in a suitable dispersion medium.

9. Method according to claim 8, wherein the admixed particle species comprising ionisable groups act as charging agents for each other.

10. Electrophoretic dispersion according to claim 1, wherein a charge transfer agent is present, preferably a non-ionic charge transfer agent, more preferably a sterically hindered amine or ether.

11. Electrophoretic display comprising a dispersion as defined in claim 1.

12. Electrophoretic dispersion according to claim 1, wherein each particle species further contains one or more stabilisers, wherein the stabilisers are bonded to the particle species either by covalent bonding or by non-covalent adsorption or bonding.

13. Electrophoretic dispersion according to claim 1, wherein the second particle species is capable of binding the first ionic species to provide a second charged particle species.

14. Electrophoretic dispersion according to claim 1, wherein the first ionic species is capable of providing a charge to the second particle species to provide a second charged particle species.

15. Electrophoretic dispersion according to claim 1, wherein a first charged particle species is obtained by dissociation of the first particle species in a first ionic species and the first charged particle species, and wherein an oppositely charged second charged particle species is obtained by incorporation of the first ionic species in the second particle species.

* * * * *